May 2, 1967 K. K. LARSEN ETAL 3,316,575
DOCK LEVELLERS
Filed Aug. 10, 1964 6 Sheets-Sheet 1
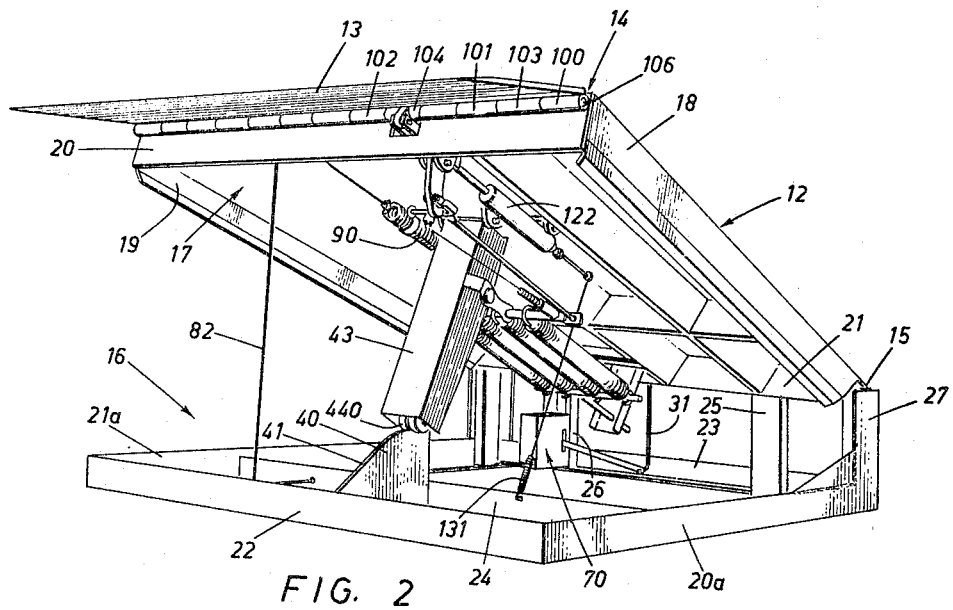
FIG. 2
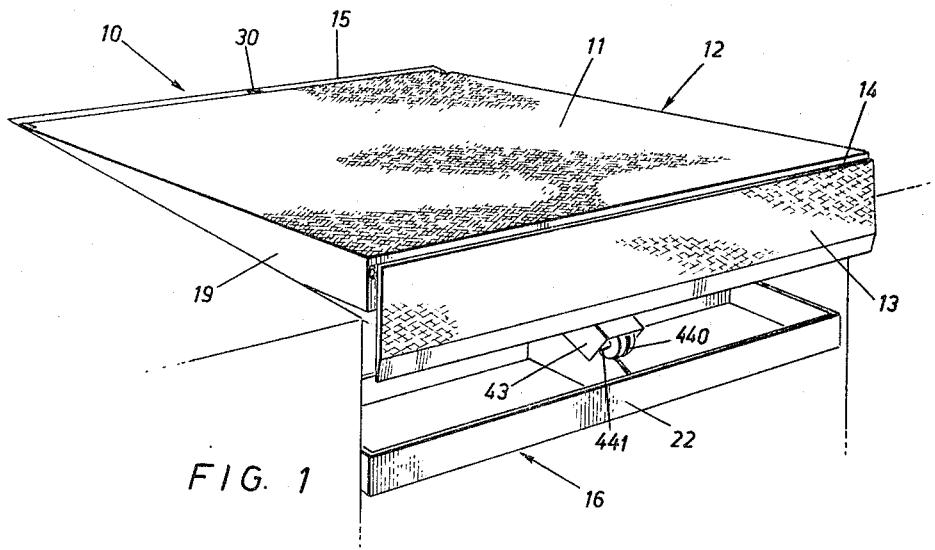
FIG. 1
INVENTORS
KURT K. LARSEN
ARNE I. PEDERSEN
BY
Attorney

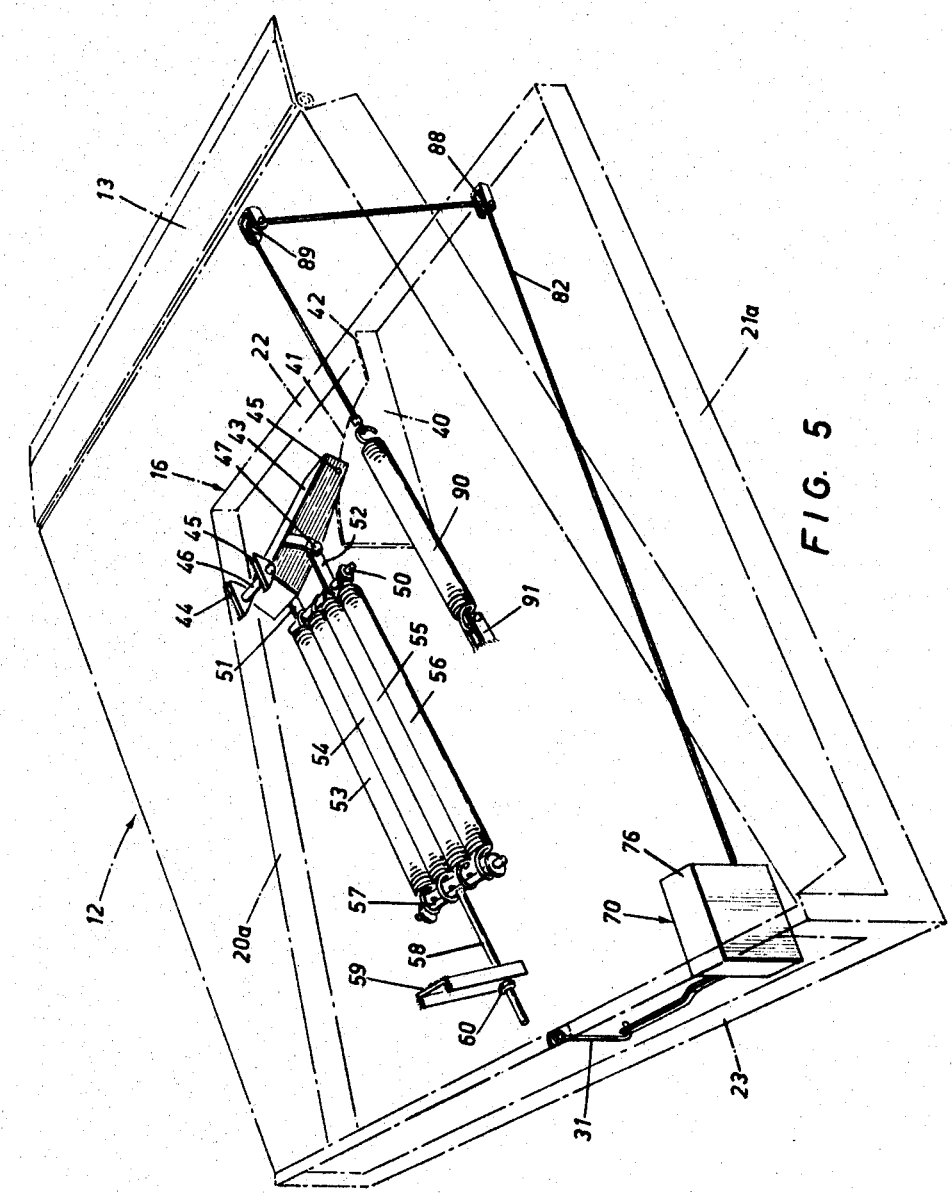

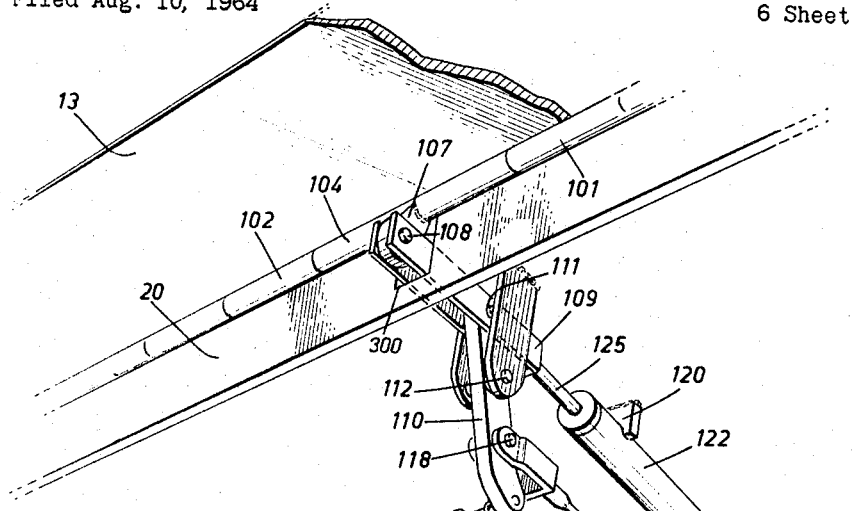
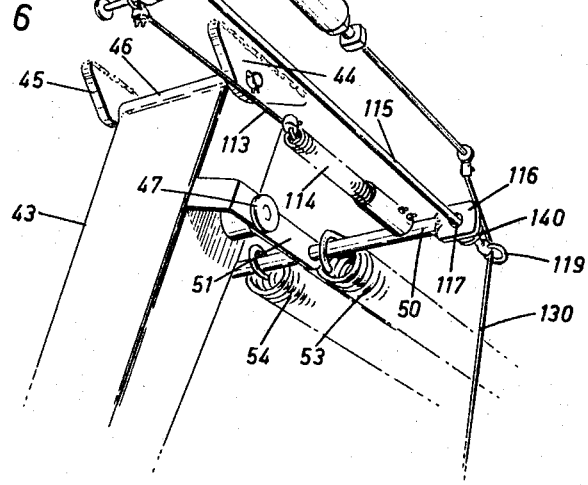
FIG. 6
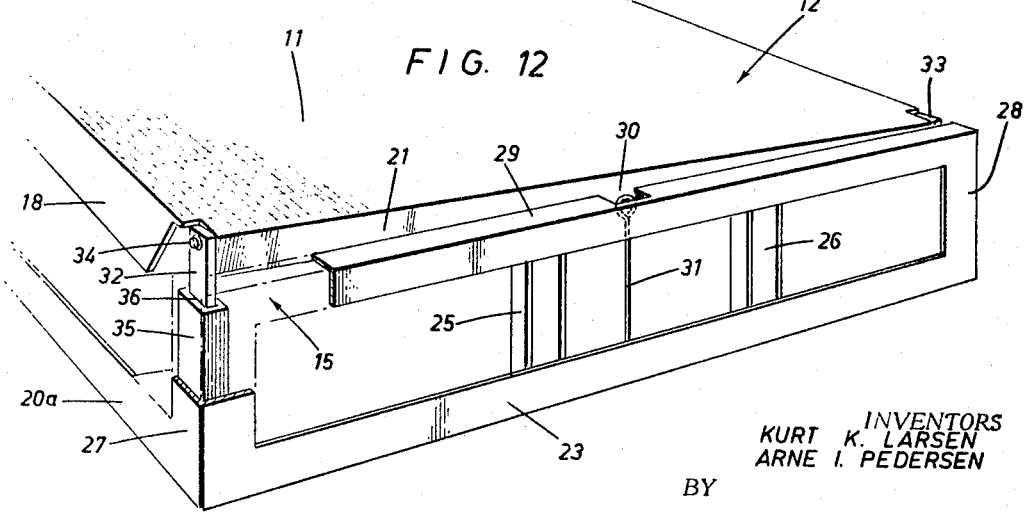
FIG. 12
INVENTORS
KURT K. LARSEN
ARNE I. PEDERSEN
BY
Douglas S. Johnson
Attorney

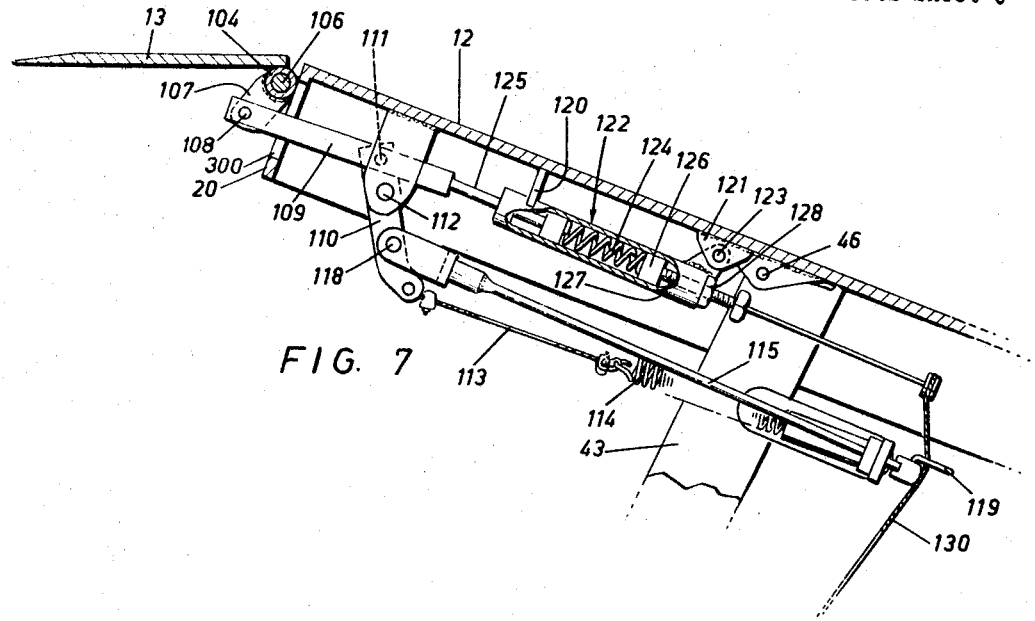
FIG. 7
FIG. 8
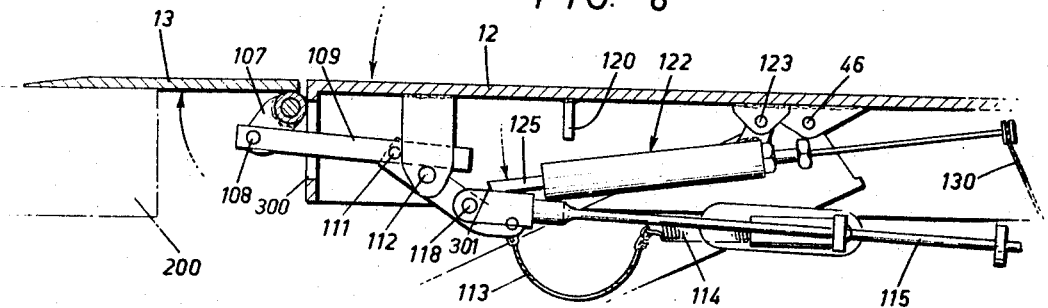
FIG. 9

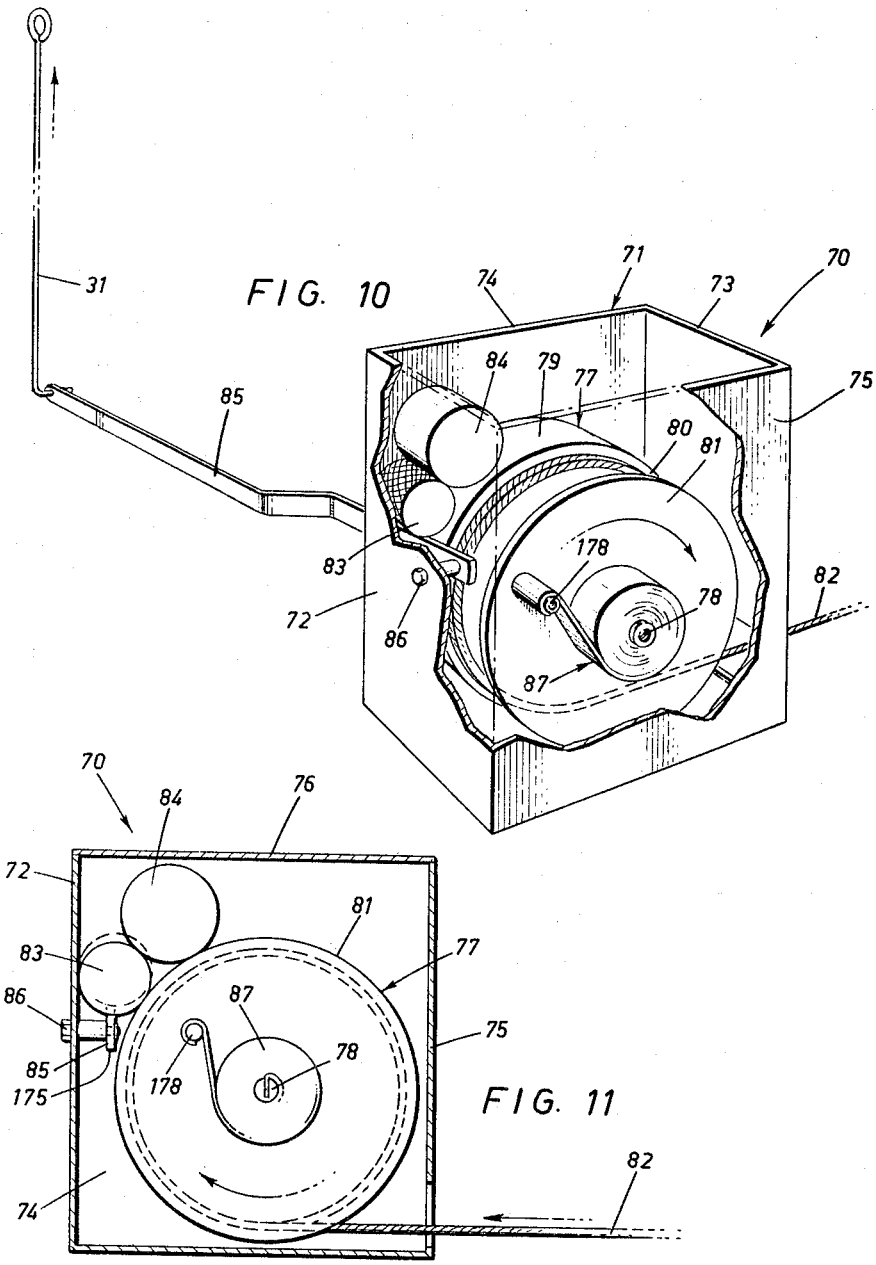

United States Patent Office 3,316,575
Patented May 2, 1967

3,316,575
DOCK LEVELLERS
Kurt K. Larsen, Islington, Ontario, and Arne I. Pedersen, Georgetown, Ontario, Canada, assignors to Blue Giant Equipment of Canada Limited, Brampton, Ontario, Canada
Filed Aug. 10, 1964, Ser. No. 388,726
5 Claims. (Cl. 14—71)

This invention relates to dock levellers, such as are employed to facilitate the loading of articles from docks or platforms.

Dock levellers comprise essentially a platform which is raised or lowered by a mechanism which may be a biased spring arrangement, a hydraulic system or any suitable source of power.

The platform may either be hinged to the dock or a suitable mounting adjacent the dock to move about the hinge and provide a substantially continuous surface with the dock or it may be raised and lowered vertically in the manner of an elevator. It is, of course, necessary that the mechanism be easy to maintain and both economic to install and operate. Those levellers which are raised and lowered are more expensive to operate and maintain, and there is consequently in most applications, a preference for the hinged structure.

Again the hinged structures of the prior art have had several shortcomings—those employing hydraulic systems are expensive to maintain due to exposure and installation in places where there is a high incidence of dust. However, those employing spring systems have also presented difficulties. There has been an absence of lateral accommodation to the vehicle and the platform has had limited movement below the level of the supporting frame because of the disposition of the actuating mechanism.

There has also been further difficulty in that the biased spring system has heretofore required a braking mechanism which involves engagement between a friction element and a, in some cases two, restraining cable. This leads to wear of the cable.

Another feature of the present invention is the provision of a lip mechanism on the forward edge of the dock platform which will respond to pressure and fall freely should there be improper engagement between the rear of the truck and the lip. This arrangement will reduce damage to the dock leveller. Frequently, in conventional systems if the rear of the truck engages a raised lip with any speed, there is no opportunity to stop the rearward motion of the truck and considerable damage ensues. With this present arrangement, the damage is minimized.

There is also provided in dock levellers in accordance with the present invention, a means for compensating for the changes in height between a vehicle platform and the dock leveller which necessarily ensues as the vehicle platform rises or falls according to whether it is being loaded or unloaded.

It is the principal object of this present invention to provide an improved dock leveller.

It is another object of this present invention to provide an improved brake mechanism for dock levellers.

It is another object of this present invention to provide an improved actuating mechanism for dock levellers.

It is another object of this present invention to provide an improved lip mechanism which will collapse if improperly engaged with a vehicle.

In accordance with the present invention, there is provided an adjustable dock leveller comprising: a ramp member having a front edge and a rear edge, means hingedly mounting said ramp member adjacent the rear edge thereof for movement about a horizontal axis, a support surface disposed below said ramp member, hinged elevating means having a movable end extending between said ramp and said surface, and biasing means normally urging said hinged means to move said end about the axis of said hinge whereby said ramp is raised.

In accordance with an alternative feature of the present invention there is provided an adjustable dock leveller comprising: a ramp member having a front edge and a rear edge; means hingedly mounting said ramp member adjacent the rear edge thereof for movement about a horizontal axis, elevating means normally urging said ramp means to move about said horizontal axis into an elevated position, and brake means to restrain movement of said ramp means in at least one attitude, said brake means comprising: a flexible substantially non-extensible member secured to said ramp at a first end and at a second end to a rotatable winding drum, means to rotate said drum, and stop means engageable upon actuation with said drum to restrain movement thereof.

In accordance with an alternative feature of the present invention there is provided in an adjustable dock leveller having a ramp member hinged to move a horizontal axis adjacent a rear edge thereof and a lip member hinged to move about a forward edge of said ramp member, the improvement comprising in combination: elevating means for raising said ramp member about said axis, and through a predetermined arc, and lip-lifting means responsive to actuation of said elevating means to raise said lip.

These and various other objects will become more apparent from the following description and drawings in which a particular embodiment is described by way of illustration only, and in which:

FIG. 1 is a general perspective front view of a dock leveller in accordance with the invention, mounted in a loading bay and in a slightly elevated attitude, FIG. 2 is a general perspective front view of a dock leveller in accordance with the present invention with the ramp thereof raised, FIG. 3 and 4 are schematic side views illustrating a ramp employing an elevating mechanism in accordance with the present invention, FIG. 5 is a general perspective view of a dock leveller in accordance with the present invention, from the top and serves to illustrate the elevating mechanism and brake mechanism with the ramp and supporting frame being shown in dotted outline, FIG. 6 is a fragmentary perspective view of the front of a dock leveller in accordance with the invention and serves to illustrate a lip-lifting mechanism.

FIGS. 7, 8 and 9 are side sectional views of the front of a dock leveller in accordance with the invention and serve to illustrate a mechanism for controlling the attitude of a lip in accordance with the present invention.

FIG. 10 is a fragmentary perspective view of part of a brake system in accordance with the invention.

FIG. 11 is a schematic sectional side view of a part of a brake system and serves to illustrate the method of operation thereof; and FIG. 12 is a fragmentary perspective view of the rear of a dock leveller and serves to illustrate a method of hingedly mounting the rear end of dock leveller in accordance with the present invention.

Figure 4:
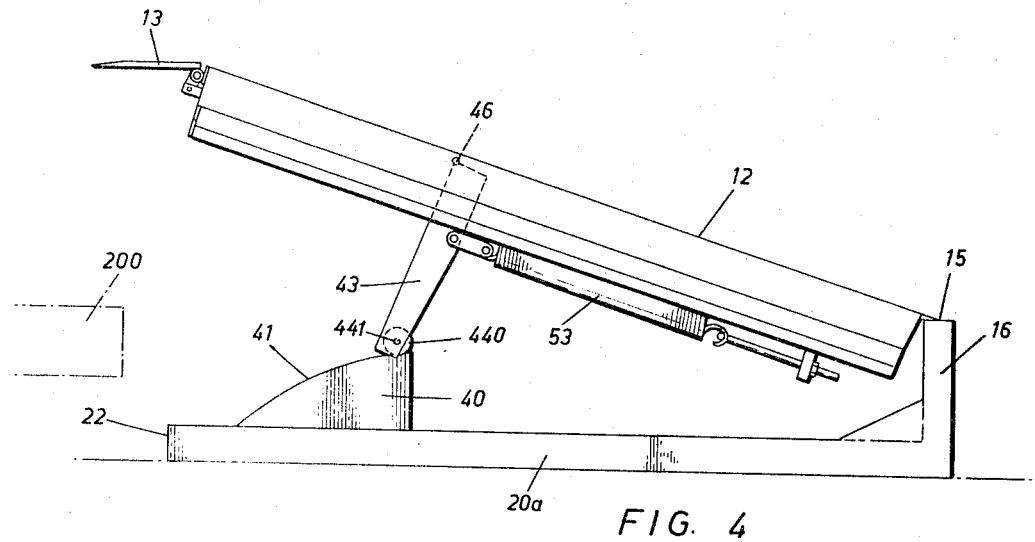

Referring now to the drawings, in FIG. 1 there is illustrated a general front perspective view of a dock leveller in accordance with the present invention mounted in a loading bay generally indicated at 10. In this illustration, the upper surface 11 of a ramp member 12 is displayed in a slightly elevated attitude, but it will be understood that normally when not in use the upper surface 11 will be substantially flush or coplanar with the upper surface of the dock.

It will also be observed that a lip 13 is hingedly secured to the forward edge 14 of the ramp member 12 so that it is in a normally dependent position when not in use.

As illustrated in FIG. 2 the dock leveller generally comprises a ramp member 12 which is hingedly mounted adjacent its rear end 15 to a supporting frame generally indicated at 16. The ramp 12 comprises a rigid frame 17 having side members such as 18 and 19 and end members 20 and 21. On this frame a rigid sheet or surface such as 11 is secured and transverse and longitudinal braces may be supplied as necessary. The particular structure of the frame 17 will, of course, depend upon the loads to be supported.

The supporting frame 16 also comprises side members 20a, and 21a and end members 22 and 23 secured one to the other in the manner shown to provide a rigid structure. Again, transverse bracing members such as 24 may be provided as necessary. To the rear end member 23 a series of vertically extending channel members such as 25 and 26 are mounted and at the junctions between member 23 and 20a further vertical corner members such as 27 and 28 are secured. The upper ends of these several members 27, 28, 25 and 26 are secured together by a horizontally extending channel member 29 to provide a rigid structure. The upper surface of channel member 29 is provided with an opening 30 intermediate its length to accommodate and permit entry to the brake actuating lever or rod 31.

Adjacent the rear edges of ramp member 12 a pair of bars such as 32 and 33 are hinged one on either side by means of individual pins such as 34 extending therethrough. This arrangement permits ramp 12 to swing through. This arrangement permits ramp 12 to swing about a horizontal axis, however, it will be observed that upon the inner side of channel members 27 and 28 resectively, see FIG. 12, guide members such as 35 defining channels such as 36 are rigidly mounted to slidably receive their respective bar members 32 and 33. This arrangement will permit tilting of the ramp member 12 about a second horizontal axis transverse to the main hinge axis mentioned previously.

On frame 16 adjacent the forward edge thereof, intermediate its width there is rigidly secured, as shown in FIG. 5, a plate 40. Plate 40 has an upper edge which provides a surface 41 which curves upwardly and towards the rear of the dock leveller. The precise configuration of this plate member 40 will depend upon the loads which the ramp is calculated to bear, and the characteristics of the remaining components. However, it will be noticed in this embodiment that member 40 is provided with a horizontal portion 42 adjacent the forward edge thereof. Upon the upper surface 41 of member 40 a leg member 43 rides. This leg member 43 is hingedly secured adjacent its upper end by means of a bracket comprising members 44 and 45 and a transverse pin 46 extending between the aforementioned brackets and through sides of leg member 43. The lower end of leg member 43 is provided with a wheel 440 rotatably mounted by means of an axle 441 to leg member 43. Intermediate the length of leg 43 a second spindle 47 is mounted and by means of two rearwardly extending spring plates 51 and 52 rotatably connected thereto a spring system, in this case springs 53, 54, 55 and 56 are hingedly connected by means of transverse rod 50. The rear ends of springs 53, 54, 55 and 56 are engaged to a second transverse rod 57 which is, in turn secured by means of a rod 58 to a downwardly extending channel member 59 which is rigidly secured to the undersurface of the ramp member 12. The coil springs 53, 54, 55 and 56, the ramp member 12, the leg member 43 and the surface 41 has such characteristics and are in such a relationship that the coil springs are under tension and will normally urge the leg member 43 to ride up the surface 41 if no restraint is placed upon the structure. The rear end of rod 58 may be threaded and provided with a nut such as 60 engageable with the remote surface of channel member 59 in the manner shown to provide a fine adjustment for the tension.

Figure 3:
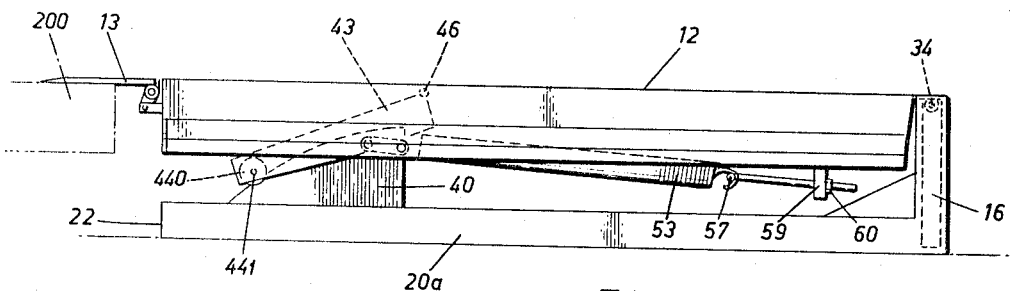

The mode of operation of this mechanism is illustrated in FIGS. 3 and 4. In FIG. 3, the lip 13 is shown as extending substantially horizontal in engagement with the upper surface of a truck platform illustrated in dotted outline. The lip 13 will normally assume a freely dependent position relative to the ramp when the ramp is not in use. As shown, the leg member 43 has its lower end adjacent the forward end of surface 41 and the biasing springs such as 53 are under tension. As soon as the braking mechanism is released the tension in the springs 53, 54, 55 and 56 causes the wheel 440 to ride up surface 41 so that the leg member 43 will assume the attitude illustrated in FIG. 4.

The braking mechanism and the mechanism which compensates for the change in height of a vehicle platform relative to the dock leveller of the present invention are illustrated in FIGS. 10, 11 and 5. On frame 16 adjacent the rear end thereof, a brake box 70 is mounted. Brake box 70 comprises a housing 71 having front and rear walls 72 and 73 and side walls 74 and 75 which are, of course, enclosed by a top wall 76 and a bottom wall, not shown. Within brake box 70 a drum 77 is rotatably mounted upon a spindle 78 extending between side walls 74 and 75 in the manner shown. Drum 77 comprises two main parts: 79 and 80 with the portion indicated at 80 having a reduced diameter and an end flange 81. This portion accommodates a cable 82 which is wound thereabout. Above surface 80 are provided two substantially cylindrical members 83 and 84. The surface of cylinder 83 is knurled as illustrated, and the cylinder 84 serves as a weight. To the rear wall 72, a lever 85 is hingedly secured by means of a pin 86. Lever 85 extends through a slot 175 in the side wall 74 and is secured at its remote end to the lower end of actuating rod 31. As will be observed from FIG. 11, the relative dimensions of cylinder 83 and the distance between cylinder 80 and the rear wall 72 are such that when cylinder 83 is held down by means of the weight 84, it will engage both the adjacent surfaces of rear wall 72 and the drum 80 to hold the drum in a fixed position. It will be observed from FIG. 10 that the brake drum 77 while as mentioned previously is rotatably mounted, it is normally urged in the direction of the arrows by means of a biased spring 87 connected between side walls 79 and the pin 178 on drum portion 80. The cable 82 is led forward through a hole in front wall 73 to the front end of frame 16 in the manner illustrated in FIG. 5, around a pulley 88 mounted adjacent the front edge of frame 16, over a pulley 89 mounted adjacent the front edge of ramp member 12 on the underside thereof and rearwardly again, to be secured to the forward end of spring 90. The rear end of spring 90 is in turn secured by means of a bracket 91 to the underside of the ramp member 12.

Thus, when the operator lifts rod 31, lever 85 will turn about hinge 86, cylinder 83 will be knocked upwards as illustrated by the dotted outline in FIG. 11, out of engagement with both wall 72 and drum portion 80. The tension on the spring system constituted by springs 53, 54, 55 and 56 is greater than the tension exerted by the spring 87, the cable 82 will be unwound from the drum portion 80 as the ramp 12 rises and the original tension on spring 90 will diminish tending to pull cable 82 rearward at the end remote from brake box 70. The knurled cylinder 83 due to its own weight, or as in this embodiment under the influence of weight 84 will, of course, tend to return to the original position illustrated in FIG. 11 and maintain the equilibrium achieved when the ramp 12 has assumed its final attitude. The cylinder 83 and the biased drum 80 will coact so that the cylinder 83 when the ramp 12 tends to rise, 83 will tend to be wedged in and in the reverse direction, the cylinder 83 will tend to be urged upwards out of engagement. To compensate for the changes in the relative height between the dock leveller ramp 12 and the vehicle platform, spring 90 will compensate for those tensions which may be exerted upon cable 82 as a result of such height variations, increasing or decreasing the tension in response to these height differentials.

To the upper forward edge of ramp member 12 a lip member 13 is hingedly secured. On the forward edge 14 of ramp member 12 a plurality of spaced apart tubes such as 100, 101 and 102 are provided, and on the rear edge of the lip member 13 corresponding spaced apart tubes which are adapted to mate with the intervals between the tubes 100 and 101, which tubes are indicated at 103 and 104 are provided. These two series of tubes are secured in engagement by means of a rod or pin 106 extending therethrough.

As illustrated in FIGS. 2, 5, 6, 7, 8 and 9, a crank 107 is rigidly secured to tube section 104 of the lip member 13. Cam 107 is in turn, hingedly secured by a pin 108 to a lever 109 adjacent the forward end thereof. Lever 109 extends through an opening 300 in the front wall of ramp member 12. To lever 109 a second lever 110 is hingedly secured by means of a pin 111 in the manner illustrated. Lever 110 is in turn hingedly secured intermediate its length by a pin 112 to a bracket rigidly secured to the underside of ramp member 12. The lower extremity of lever 110 is secured by means of a cable 113 and a spring 114 to the transverse rod 50. To lever 110 intermediate its length a further rearwardly extending rod 115 is hingedly secured as illustrated in FIGS. 6 and 7. The end of rod 115 extends through a plate 116 adjacent the rear end thereof, which plate has a hole 117 dimensioned to permit the sliding of rod 115 therethrough. The remote end of rod 115 from hinge 118 is provided with a ring 119 and a nut 140 to govern the travel through hole 117. To the underside of ramp member 12 rearward of the mounting bracket a transversely extending bracket 120 is rigidly secured and rearward of bracket 120 a further pair of spaced apart brackets 121 is secured. To brackets 121, a cylinder 122 is hingedly secured by means of a pin 123 and within cylinder 122 a spring 124 is disposed to engage a plate having a rod rigidly secured thereto. Adjacent the rear end of cylinder 122 a plate 126 engageable with the rear end of spring 124 is adjustably mounted by means of a threaded rod 127 and a nut 128. The rearmost end of rod 127 is connected by means of cable 130 extending through ring 119 and a spring 131 to the transverse member 24 of the base frame 16. FIGS. 9 and 7 illustrate the relationship between the several components which constitute the lip raising mechanism when the ramp is in an inoperable condition and in an elevated condition, respectively.

As the leg member 43 rises under the action of springs 53, 54, 55 and 56, the bar 50 will move relatively rearwards. As a result of this movement, spring 114 and cable 113 tend to pull the lower end of lever 110 rearwards. The consequence of this action is that lever 109 will move forward urging cam 107 forward to turn the lip 13 in an upward direction. Simultaneously, rod 115 hinged to lever 110 will be urged relatively rearward. This action and the engagement between the cable 130 and the ring 119 on the end of rod 115 causes the forward end of cylinder 122 to move about its hinge in an upward direction. The leading edge of piston 125 is bevelled or provided with a surface sloping from the rear of the ramp member up in a forward direction. The end of piston 125 consequently engages the rear surface of lever 109 to hold the lip member 13 in the attitude illustrated in FIG. 7.

It will be noticed that the lip member 13 does not assume a completely horizontal attitude with respect to the upper surface of the ramp member 12. If the ramp has not been raised sufficiently to accommodate or properly engage the platform of a vehicle which has backed up to the loading bay and the rear of the vehicle hits the lip 13, at impact the engagement between the surfaces of lever 109 and the piston 125 will be released and the cylinder 122 will due to the bevelled leading edge 301 and the lever 108 moving away and the lip 13 will fall in the manner shown by the arrow in FIG. 9. These actions and reactions are such that in most instances, the lip will fall prior to a serious damage being done to the ramp or any of the other components.

It will also be noticed that the arrangement of the cable 82 and in general, the mechanism for maintaining the attitude of the ramp member and the elevating mechanism are all disposed well within the forward limits of the ramp member 12. This feature also limits the possibilities of the elevating mechanism being seriously damaged by any impact with a vehicle.

Normally, as previously mentioned, the dock leveller in accordance with the present invention is installed in accordance with the manner illustrated in FIG. 1. When a vehicle approaches the loading ramp, the rod 30 is pulled upward to release the brake mechanism by the disengagement of the cylinder 83 from the rear wall 72 and the cylinder 80 of the brake mechanism. The ramp is raised in the manner previously described by the coaction of the springs 53 through 56 with the leg or channel member 43 and the cable 82 is unwound from the drum 80. After the vehicle has approached the loading dock and is correctly aligned, the operator walks upon the ramp member 12 and the ramp member 12 will move downward by virtue of the biasing, the characteristics of the spring system and the attitude of the leg member 43 to bring the lip 13 which has risen simultaneously with the elevation of the ramp member 12, to contact the rear platform of the vehicle. At the moment of impact of the lip member 13 with the truck platform, lever 109 will be pulled forward, the engagement between piston 125 and lever 109 will be broken. At this point, the relationship between the various components will be as illustrated in FIG. 8 with the truck platform being indicated at 200. If the truck is not horizontal, when a load such as a fork lift truck moves upon the ramp and moves over the lip 13, then the ramp 12 will tilt as illustrated in FIG. 12 about the horizontal axis for a predetermined distance to accommodate the tilt on the truck platform.

This tilt is maintained until an excess weight such as fork lift truck again passes over the dock leveller. The springs 53, 54, 55, 56 and the leg member 43 in this position produce a frictional engagement between the bars 32 and their respective channels to maintain this attitude.

As the load of the vehicle is removed or increased, the variations in the relative height of the truck to the ramp will be compensated for by spring 90 and the normal variations in tension which would be set up in cable 82 will be largely compensated for by the spring 90.

As the loaded or unloaded truck moves away, then the lip 13 will fall freely and the ramp member 12 may be returned to its normal inactive position simply by the operator walking thereon.

While this present invention has been described with particular reference to a specific embodiment, it will be apparent to others skilled in the art that equivalent mechanisms and means may be substituted for those described without departing from the spirit of the present invention as defined in the appended claims.

What we claim is:

1. An adjustable dock leveller comprising: a ramp member having a front edge and a rear edge; means hingedly mounting said ramp member adjacent the rear edge thereof for movement about a horizontal axis, elevating means normally urging said ramp means to move about said horizontal axis into an elevated position, and brake means to restrain movement of said ramp means in at least one attitude, said brake means comprising: a flexible substantially non-extensible member secured to said ramp at a first end and at a second end to a rotatable winding drum, means to rotate said drum, and stop means engageable upon actuation with said drum to restrain movement thereof, said means to rotate said drum comprising a coiled spring connected to said drum to normally urge said drum to retract said flexible member.

2. An adjustable dock leveller comprising: a ramp member having a front edge and a rear edge; means hingedly mounting said ramp member adjacent the rear edge thereof for movement about a horizontal axis, elevating means normally urging said ramp means to move about said horizontal axis into an elevated position, and brake means to restrain movement of said ramp means in at least one attitude, said brake means comprising: a flexible substantially non-extensible member secured to said ramp at a first end and at a second end to a rotatable winding drum, means to rotate said drum, and stop means engageable upon actuation with said drum to restrain movement thereof, said brake means including a housing, said stop means comprising a free member disposed in said housing, said free member being frictionally engageable with an adjacent surface of said drum to restrain movement thereof in a predetermined direction and means for moving said free member out of frictional engagement with said drum.

3. A dock leveller as claimed in claim 2 wherein said drum is mounted in said housing at a predetermined distance from a housing wall, said free member comprising a knurled cylinder dimensioned to engage said drum and said wall.

4. An adjustable dock leveller comprising in combination a ramp member having a front and a rear edge; means hingedly mounting said ramp member for movement at least about a horizontal axis, a support surface disposed below said ramp member, hinged elevating means having a movable end extending between said ramp and said surface, biasing means normally urging said hinged means to move said end about the axis of said hinge whereby said ramp is raised, a normally pendent lip hinged to said front edge of said ramp member and means responsive to the elevation of said ramp to raise and maintain said lip member in an elevated attitude, said means responsive to the elevation of said ramp member to raise said lip member comprises: a lever hingedly connected to said lip member, a rod connected to said lever and said elevating means, whereupon elevation of said ramp member said lever is urged forward and said lip member raised.

5. An adjustable dock leveller as claimed in claim 4 including releasable locking means engageable with said lever.

References Cited by the Examiner

UNITED STATES PATENTS

| | | | |
|---|---|---|---|
| 2,751,615 | 6/1956 | Kelley | 14—71 |
| 2,908,024 | 10/1959 | Holleen | 14—71 |
| 3,137,017 | 6/1964 | Pfleger | 14—71 |
| 3,137,876 | 6/1964 | Loomis | 14—71 |
| 3,167,796 | 2/1965 | Layne | 14—71 |
| 3,204,270 | 9/1965 | Fenton | 14—71 |

CHARLES E. O'CONNELL, *Primary Examiner.*

N. C. BYERS, *Assistant Examiner.*